United States Patent [19]

Cousino et al.

[11] 4,422,940

[45] Dec. 27, 1983

[54] METHOD OF NEUTRALIZING AND DETOXIFYING WASTES CONTAINING ORGANIC COMPOUNDS

[75] Inventors: James L. Cousino; James A. Nalewick, both of Montague; Blair H. Hills, Whitehall, all of Mich.

[73] Assignee: Bofors Nobel, Incorporated, Muskegon, Mich.

[21] Appl. No.: 378,763

[22] Filed: May 17, 1982

[51] Int. Cl.³ .................. B01D 1/26; C02F 3/02; C02F 11/10

[52] U.S. Cl. ............................ 210/631; 210/664; 210/771; 210/806; 210/712; 159/1 RW; 159/47.3

[58] Field of Search ............ 210/631, 609, 710–713, 210/768–771, 774, 806, 663, 664; 159/1 RW, 47.3, 17 R, DIG. 25; 202/174; 203/25, 36, 37

[56] References Cited

U.S. PATENT DOCUMENTS

| | | | |
|---|---|---|---|
| 3,617,559 | 11/1971 | Cywin | 210/713 |
| 3,716,458 | 2/1973 | Greenfield et al. | 203/11 |
| 3,855,079 | 12/1974 | Greenfield et al. | 203/47 |
| 3,898,134 | 8/1975 | Greenfield et al. | 203/6 |
| 3,917,508 | 11/1975 | Greenfield et al. | 159/47 R |
| 3,929,586 | 12/1975 | Slikkers, Jr. | 210/774 |
| 3,947,327 | 3/1976 | Greenfield et al. | 203/7 |
| 3,950,230 | 4/1976 | Greenfield et al. | 203/47 |
| 4,007,094 | 2/1977 | Greenfield et al. | 202/174 |
| 4,013,516 | 3/1977 | Greenfield et al. | 201/2.5 |
| 4,270,974 | 6/1981 | Greenfield et al. | 159/16 S |
| 4,276,115 | 6/1981 | Greenfield et al. | 159/1 RW |
| 4,289,578 | 9/1981 | Greenfield et al. | 159/47 WL |
| 4,336,101 | 6/1982 | Greenfield et al. | 159/47.3 |

*Primary Examiner*—Benoit Castel
*Attorney, Agent, or Firm*—Price, Heneveld, Huizenga & Cooper

[57] ABSTRACT

A method of neutralizing and detoxifying waste material containing both an acid and a toxic organic compound. The waste material is combined with sufficient oil and sufficient caustic to form a pumpable slurry having a pH of 7 or higher. The oil is then separated from the slurry leaving a dry, deoiled material, containing a salt and the toxic organic compound. This material is pyrolyzed at a temperature below the melting point of the salt and sufficiently high to vaporize the toxic organic compound. The resultant vapor is then incinerated to detoxify the vaporized organic compound.

36 Claims, 6 Drawing Figures

4,422,940

METHOD OF NEUTRALIZING AND DETOXIFYING WASTES CONTAINING ORGANIC COMPOUNDS

BACKGROUND OF THE INVENTION

This invention relates to methods of treating wastes, and more particularly methods of neutralizing and detoxifying wastes containing acids and toxic organic compounds.

Many industrial processes produce waste materials which include toxic organic compounds dissolved in acids. Typical acids include sulfuric, hydrochloric, and nitric acid; and typical organic compounds include dichlorobenzidine, orthochloraniline, and polychlorinated biphenyl. Disposal of such waste materials is complicated due to the presence of both the acids and the toxic organic compounds. Although the waste materials may be hauled to a toxic disposal site, such transportation and disposal is extremely expensive.

Most typically, waste materials containing acids are neutralized and pumped to a settling pond, comprising a pit, preferably clay-lined, into which the neutralized material is placed. Concentrated caustic, such as calcium hydroxide, calcium oxide, or sodium hydroxide, is mixed with the material to neutralize the acid, producing an extremely thick salt slurry which, because of its viscosity, may not be completely neutralized. The neutralized material may be periodically hauled to a toxic disposal site. However, if the settling pond is not carefully lined, both the toxic organic compounds and the remaining acids can leach into the ground water, rendering the same non-potable. For this and other reasons, many states now prohibit settling ponds of this type and require that existing ponds be eliminated.

Alternatively, the toxic, acidic materials may be burned to destroy the organic compounds. More particularly, government regulations state that subjecting the toxic organics to a temperature of 2200° F. for a period of two seconds presumably destroys all toxic compounds. However, the acids in the waste material must be neutralized before the material is burned, producing a liquid salt stream, which is extremely difficult to handle. Water must be distilled off the waste material prior to burning, or the burning operation produces a high-volume gas stream which must be scrubbed at high expense. Such distillation is extremely difficult and also relatively expensive. Alternatively, prior to burning, the waste material may be neutralized, as in settling ponds, in which case the material becomes extremely thick and difficult to handle due to the precipitation of salts, such as calcium sulfate, calcium chloride, and calcium nitrate, creating an extremely thick, non-pumpable salt slurry. Large quantities of water must be mixed with the neutralized material in order to transport the material to the burner. This water must then be distilled off the mixture prior to burning or handled as a high-volume gas stream after burning, with the attendant, virtually prohibitive costs discussed above.

SUMMARY OF THE INVENTION

The aforementioned problems are solved by the present invention. Essentially, a method of neutralizing and detoxifying waste material containing acids and toxic organic compounds is provided wherein the waste material is combined with sufficient oil and sufficient caustic to neutralize the acids and form a pumpable slurry containing the salts and toxic organic compounds. The slurry is then deoiled, leaving contaminated solids, which are pyrolyzed at a temperature sufficiently high to vaporize the toxic organic compounds and sufficiently low to prevent the salts from melting. The vaporized organic compounds are then detoxified by incineration. The solids leaving the pyrolyzer are both neutralized and detoxified.

Neutralization of the waste material in a fluidizing oil enables the use of a concentrated caustic without additional water to render the salts of neutralization transportable. Typically, concentrated caustics are approximately one quarter the price of other caustics, resulting in a significant savings. Water consumption is greatly reduced in the method of the present invention; the need for a high-volume scrubbing system is eliminated; and the energy otherwise necessary to remove added water from the toxic materials is saved. Additionally, the use of a fluidizing oil for transportation enables old soils and sludges, for example from settling ponds, to be introduced into the system, again without addition of large quantities of water.

In a preferred embodiment of the invention, the pumpable slurry is stripped of any water prior to pyrolysis to further reduce the gas stream leaving the incinerator. Heat may be recovered from both the solid material leaving the pyrolyzer and the vaporized material leaving the incinerator and used in the water evaporation and/or oil separation steps to further reduce energy consumption of the method.

These and other objects, advantages, and features of the invention will be more fully understood and appreciated by reference to the written specification and appended drawings.

DESCRIPTION OF THE PREFERRED EMBODIMENT

Figure 1:
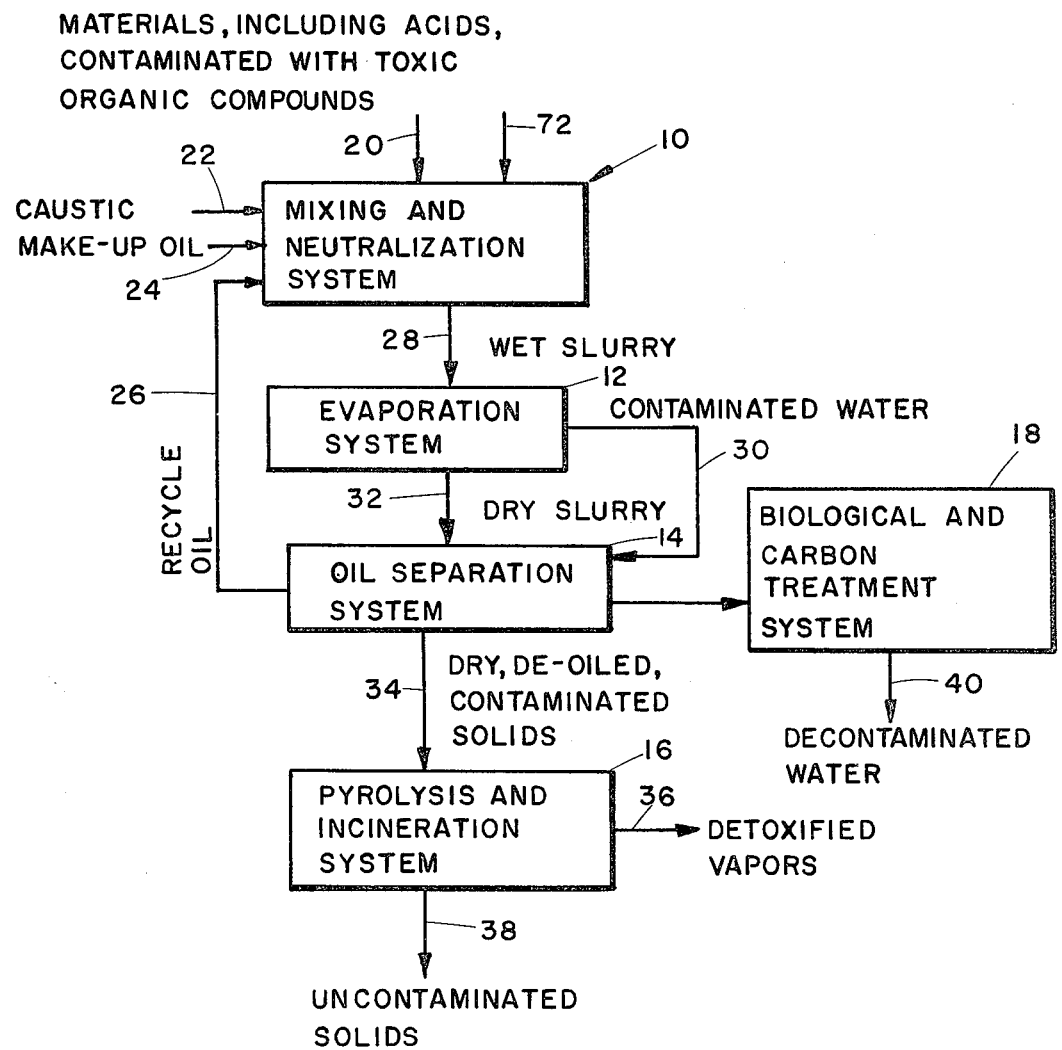
FIG. 1 is a flow chart of a system for practicing the method of the present invention.

A system (FIG. 1) for practicing a method in accordance with a preferred embodiment of the invention includes mixing and neutralization system 10, evaporation system 12, oil separation system 14, pyrolysis and incineration system 16, and biological and carbon treatment system 18. Waste materials to be neutralized and/or detoxified are introduced into mixing and neutralization system 10 through lines 20 and 72. Additionally, sufficient caustic is introduced through line 22, make-up oil through line 24, and recycle oil through line 26 to form a wet pumpable slurry having a pH of 7 or higher. This slurry exits system 10 through line 28, which leads to evaporation system 12, where water is stripped off the slurry, leaving a dry, pumpable slurry. The stripped water exits system 12 through line 30, and the dry slurry exits the system 12 through line 32 leading to oil separation system 14. Oil in the dry slurry entering system 14 is removed and recycled through line 26 into mixing and neutralization system 10. The dry, deoiled material exits system 14 through line 34 to enter pyrolysis and incineration system 16. The solids entering system 16 are first pyrolyzed at a temperature sufficiently high to vaporize the toxic organic compounds and sufficiently low to prevent the salts in the solids from melting. The vaporized organic compounds are then detoxified by incineration and exit system 16 through vent stack 36. The detoxified and neutralized solids leave system 16 through line 38. The water stripped in evaporation system 12 is conveyed through line 30 to oil separation system 14 to remove any latent oil and then through line 31 to biological and carbon treatment system 18 where the water is decontaminated and expelled through line 40.

Figure 2:
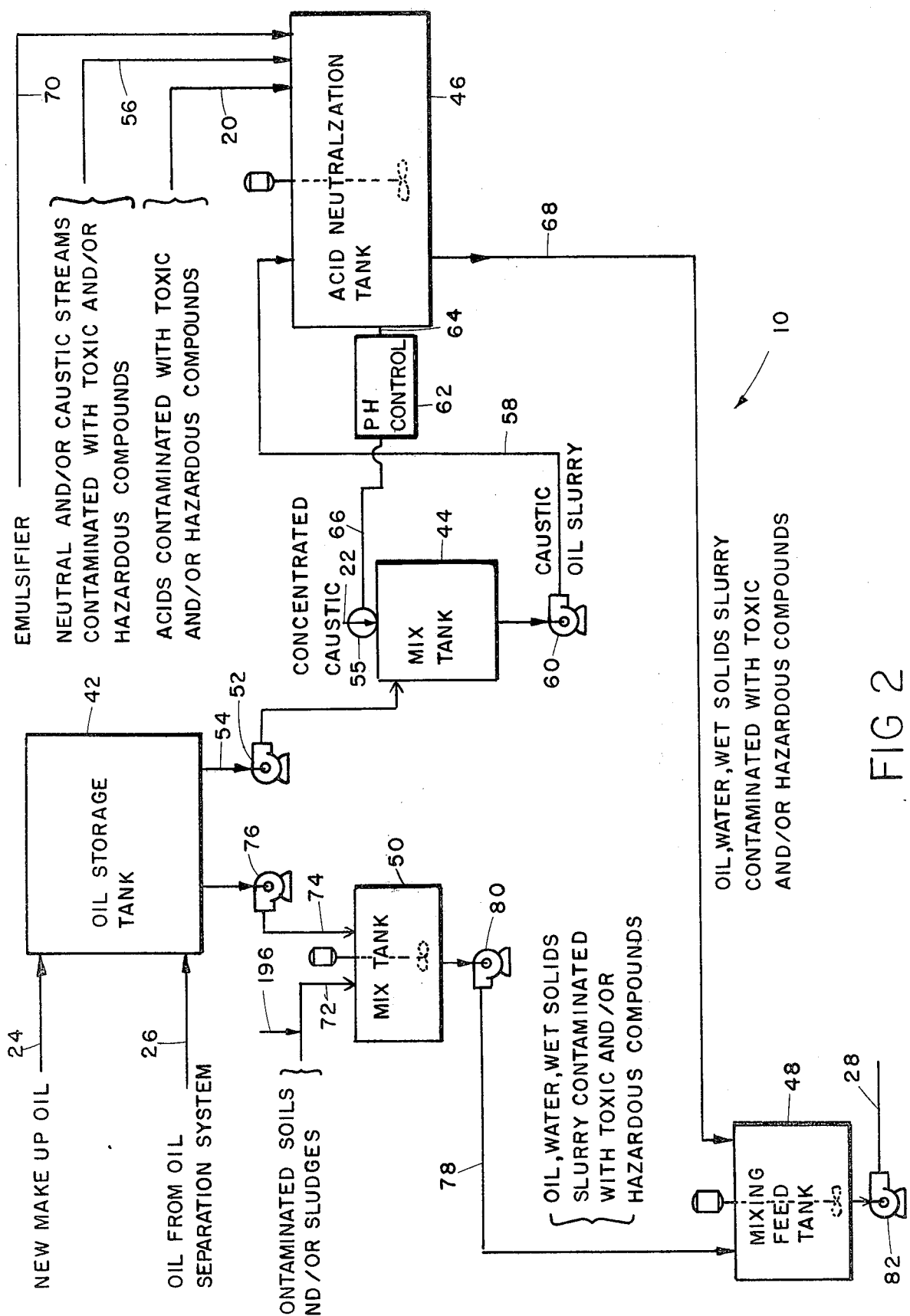
FIG. 2 is a flow chart of the mixing and neutralization system.

Mixing and neutralization system 10 (FIG. 2) includes oil storage tank 42, mix tanks 44 and 50, acid neutralization tank 46, and mixing feed tank 48. New make-up oil is introduced into storage tank 42 through line 24. The oil preferably has a relatively low boiling point so that oil separation system 14 (see FIG. 1) can operate using steam stripping. The oil also preferably has a boiling point above that of water so that the oil will not leave evaporation system 12 (see FIG. 1) with the water through line 30. Preferably, the oil is relatively volatile and has a viscosity about the same as water. Oil from oil separation system 14 (see FIG. 1) is introduced through line 26 into tank 42. Pump 52 draws oil from storage tank 42 into mix tank 44 through line 54. Concentrated caustic is introduced through line 22 into mix tank 44 to form a caustic, pumpable oil slurry. A concentrated caustic, for example calcium hydroxide, calcium oxide, or sodium hydroxide, may be used because the resultant thick salts of neutralization will be pumpable within the oil slurry.

Acidic waste materials contaminated with toxic organic compounds are introduced through line 20 into neutralization tank 46. The acids in the waste material may include sulfuric acid, hydrochloric acid, and nitric acid. The toxics dissolved in the waste material may include dichlorobenzidine, orthochloraniline, and polychlorinated biphenyl. Of course, the method of the present invention neutralizes other acids and detoxifies other organic compounds with equal applicability. Neutral and/or caustic waste materials, which may or may not be contaminated with toxic organic compounds, may be introduced through line 56 into tank 46 to be treated by the method. Any of the waste materials introduced into the system may also contain solvents, which are typically soluble in the oil. Caustic oil slurry from mix tank 44 is drawn through line 58 into neutralization tank 46 by pump 60.

PH control system 62 includes a pH probe 64 extending into tank 46 to monitor the pH of the material within the tank. Additionally, control 62 actuates valve 55 in line 22 through line 66 to control the concentration of caustic within the caustic oil slurry introduced through line 58. More particularly, control 62 insures that sufficient caustic is introduced through line 22, and consequently within caustic oil slurry in line 58 to insure that all of the acid within tank 46 is neutralized. The pH is maintained preferably at 7 or higher, more preferably at 8–12, and most preferably at 8. Because a concentrated caustic is used, the salts such as calcium sulfate, calcium chloride, and calcium nitrate produced in neutralization tank 46 are extremely thick and consequently difficult to pump. However, sufficient oil is introduced through line 58 and mixed with the other materials in tank 46 to form a pumpable slurry. Water is often introduced with the waste materials through both lines 50 and 56 and water is produced during neutralization so that the slurry within tank 46 is wet in addition to being pumpable. The heat of neutralization raises the temperature of the slurry to approximately 175° F. An emulsifier is introduced into tank 46 through line 70 to facilitate the emulsion of the soils and sludges within the fluidizing oil to lower the viscosity of the pumpable slurry within the tank. Preferably, the emulsifier is nonionic and neither a detergent nor a salt.

Contaminated soils and/or sludges are introduced at 72 into mix tank 50. Typically, these soils and sludges come from preexisting settling ponds. These soils and sludges are typically contaminated with toxic organic compounds of the variety described above and are not completely neutralized due to their sludge-like nature, even though they contain sufficient basic materials to complete neutralization. Sufficient oil is drawn from storage tank 42 into tank 50 through line 74 using pump 76 to form a wet, pumpable slurry within the tank. Once the slurry is formed, concentrated caustic within the materials disperses and completes the neutralization process. Additional caustic may be added to tank 50 if necessary.

The slurry is then drawn from tank 50 through line 78 by pump 80 and introduced into mixing feed tank 48. Additionally, the wet, pumpable slurry within neutralization tank 46 is conveyed through line 68 into feed tank 48. The slurry within tank 48 has an oil-to-solids ratio of approximately 15:1 to 1:1. Pump 82 draws the slurry from tank 48 through line 28 and forces same to evaporation system 12 (see FIG. 1).

Figure 3:
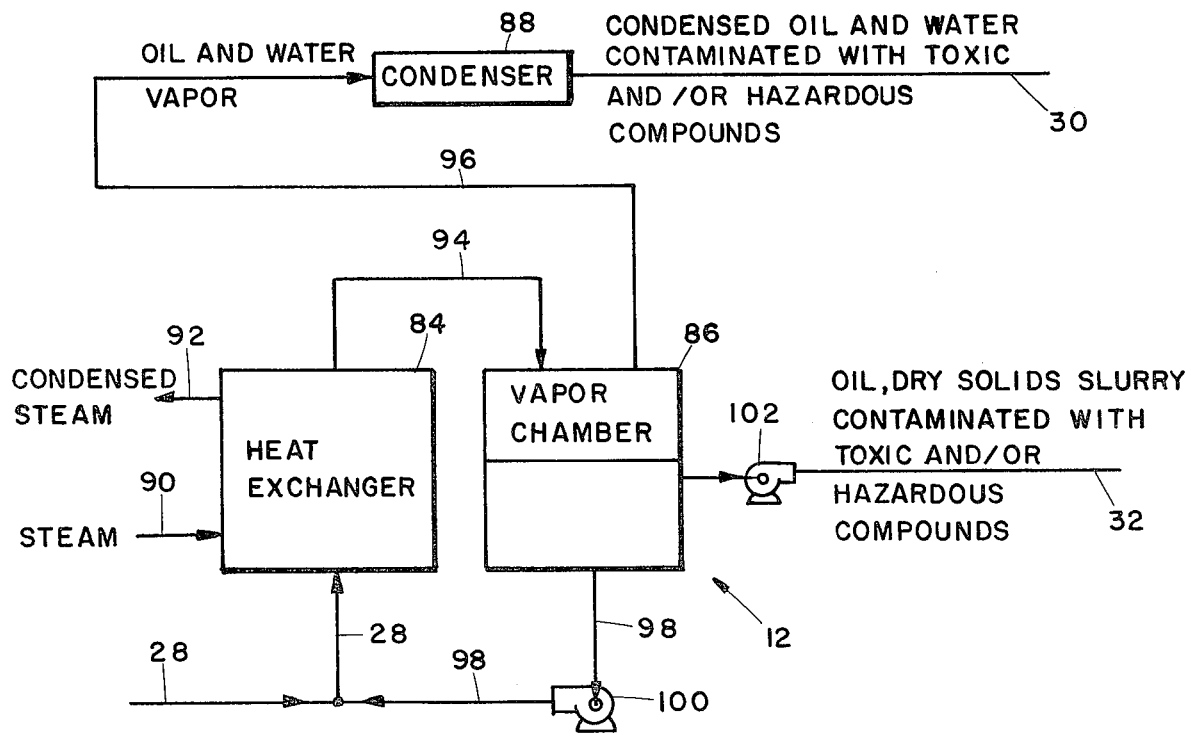
FIG. 3 is a flow chart of the evaporation system.

Evaporation system 12 (FIG. 3) includes heat exchanger 84, vapor chamber 86, and condenser 88. The wet, pumpable slurry enters evaporation system 12 through line 28 leading to heat exchanger 84. The temperature of the slurry within line 28 is approximately 105° F. Steam is introduced into heat exchanger 84 through line 90 and after warming the slurry exits the exchanger through line 92. Within heat exchanger 84, the temperature of the wet, pumpable slurry is elevated to approximately 300° F., whereupon the slurry exits the heat exchanger through line 94 leading to vapor chamber 86. As the slurry settles in vapor chamber 86, the water within the slurry, having a boiling point of 212° F., evaporates from the slurry and exits the vapor chamber through line 96. Additionally, some of the oil, which has a relatively low boiling point, may vaporize and enter line 96 with the water. The cooled slurry settles to the bottom of chamber 86 and is withdrawn through line 98 by pump 100 to be recirculated through heat exchanger 84 to re-elevate its temperature to approximately 300° F. That portion of the slurry from which all of the water has been stripped is withdrawn from vapor chamber 86 through line 32 by pump 102. This dry, pumpable slurry in line 32 has an oil-to-solids ratio of approximately 15:1 to 1:1 and contains the salts of neutralization and the toxic organic compounds.

The water and any oil vapor in line 96 are run through condenser 88 to condense the vapors, producing liquid water and oil both of which may be contaminated with the toxic organic compounds. This oil and water mixture travels through line 30 to oil separation system 18 (see FIG. 1). Optionally, condenser 88 may operate as a boiler preheat.

Although evaporation system 12 as described is a single effect system, multiple effect systems may be substituted with equal applicability. Single effect systems are less efficient than multiple effect systems at evaporating pure water vapor, while on the other hand, the multiple effect systems are relatively expensive to construct and operate.

Figure 4:
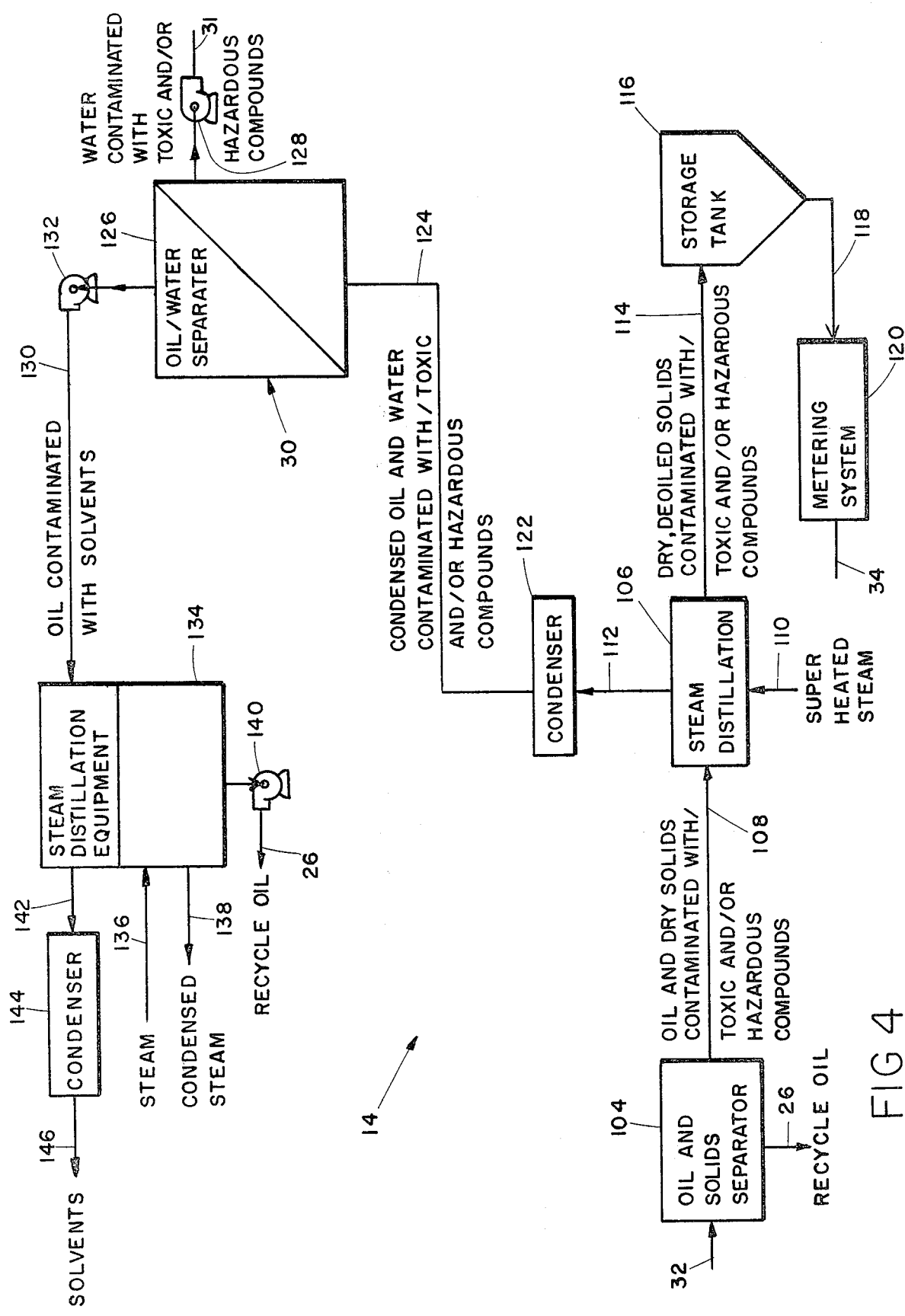
FIG. 4 is a flow chart of the oil separation system.

Oil separation system 14 (FIG. 4) includes oil and solids separator 104 and steam distillation equipment 106. The dry, pumpable slurry leaving evaporation system 12 (see FIG. 1) through line 32 enters oil and solids separator 104. In the preferred embodiment, separator 104 comprises a centrifuge. Alternatively, if the system is run in batch mode, the separator may comprise a filter-press separator. In either event, approximately 50% to 80% of the oil in the slurry entering separator 104 is separated from the slurry and recycled through line 26 to mixing and neutralization system 10 (see FIG. 1). The remainder of the slurry material exiting separator 104 through line 108 is conveyed to steam distillation equipment 106 where the residual oil is stripped from the slurry with superheated steam entering the equipment through line 110. This superheated steam has a temperature in excess of the boiling point of the oil to vaporize the oil. Both the oil vapor and steam exit equipment 106 through line 112. Virtually all of the oil remaining in the slurry entering distillation equipment 106 is stripped with the superheated steam so that the remaining solids exiting the equipment through line 114 are both dry and deoiled but still contaminated with the toxic organic compounds. These dry, deoiled solids are conveyed to storage tank 116 and then through line 118 to metering system 120, which introduces the solids into line 34 at a controlled rate.

The oil vapor and steam leaving distillation equipment 106 through line 112 pass through condenser 122 to produce liquid oil and water possibly contaminated with the toxic organic compounds. Condenser 122 may optionally operate as a boiler preheat. The oil and water mixutre in line 124 is fed into oil and water separator 126 along with the oil and water mixture in line 30 from evaporation system 12 (see FIG. 1). The water is withdrawn through line 31 by pump 128, and the oil is withdrawn through line 130 by pump 132. The water in line 31 is fed into biological and carbon treatment system 18 (see also FIG. 1).

Typically, solvents within the waste materials have relatively low boiling points and are oil soluble, such as acetone, toluene, and tetrachloroethylene. Because the solvents have boiling points above that of water and below that of the oil, these solvents will be stripped from the solids in equipment 106 and leave with the oil/steam mixture in line 112. Because the solvents are soluble in oil, these solvents will leave oil and water separator 126 with the oil through line 130. This solvent-contaminated oil is then fed into steam distillation equipment 134 wherein steam entering the equipment through line 136 and exiting through line 138 is used to evaporate the solvents from the oil. The solvents leave distillation equipment 134 through line 142 and are condensed in condenser 144, which optionally may operate as a boiler preheat. The solvents leaving condenser 144 through line 146 may be either reclaimed, if sufficiently pure, or incinerated, if insufficiently pure.

Figure 5:
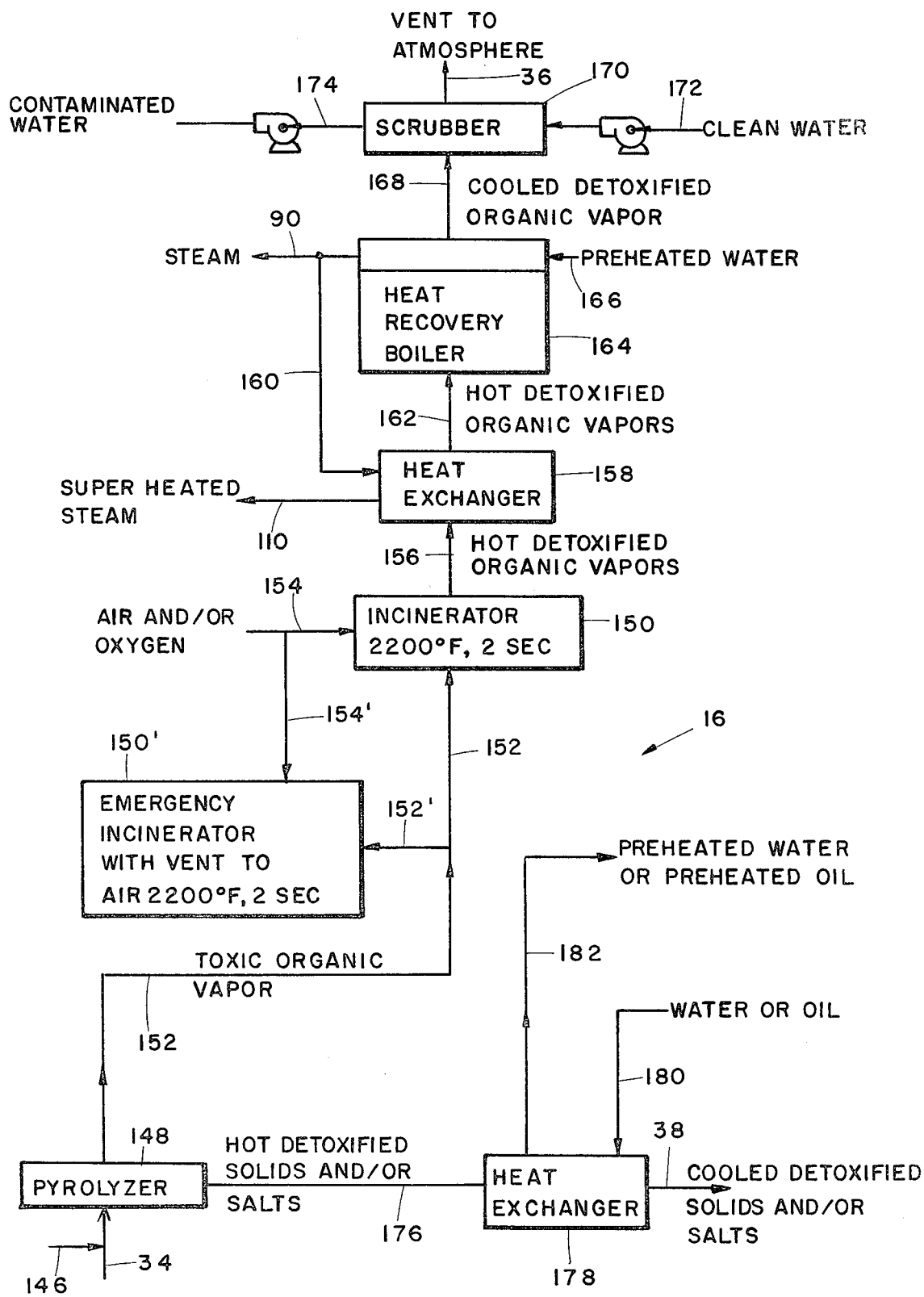
FIG. 5 is a flow chart of the pyrolysis and incineration system.

Pyrolysis and incineration system 16 (FIG. 5) includes pyrolyzer 148 and incinerator 150. The dry, deoiled, contaiminated solids leaving oil separation system 14 (see FIG. 1) enter pyrolyzer 148 through line 34. These solids are pyrolyzed within pyrolyzer 148 at a temperature sufficiently high to vaporize the toxic organic compounds but sufficiently low to prevent the salts of neutralization from melting. In the preferred embodiment, pyrolyzer 148 operates at a temperature between 700° and 1800° F., and most preferably at approximately 1400° to 1500° F. If the solvents reclaimed in oil separation system 14 (see FIG. 4) are to be incinerated, they are introduced through line 146 onto the material conveyed in line 34 into pyrolyzer 148. Consequently, the solvents, which have a relatively low boiling point, are vaporized in pyrolyzer 148 to be incinerated with the toxic organic vapors. The toxic organic, and possibly solvent, vapors exit pyrolyzer 148 through line 152 which leads to incinerator 150. In the preferred embodiment, incinerator 150 subjects the vapors entering through line 152 to a temperature of 2200° F. for a duration of two seconds. Air and/or oxygen is also introduced into incinerator 150 through line 154 to facilitate combustion of the vapors. Of course, both the temperature and the duration time in incinerator 150 can be varied depending upon the materials being incinerated. The particular parameters of the preferred embodiment have been selected to meet government regulations which presume proper detoxification.

Figure 6:
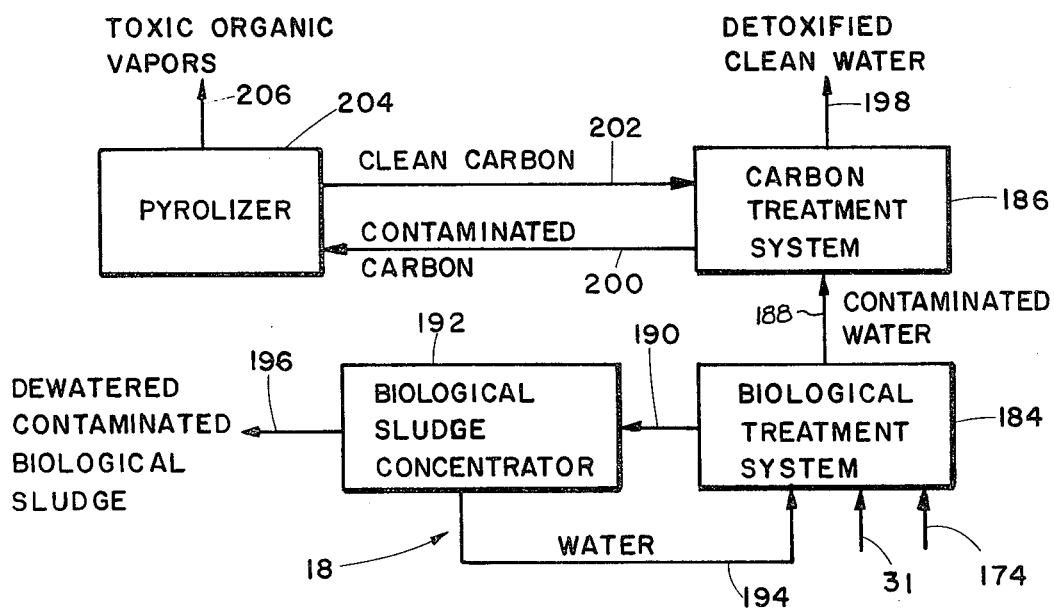
FIG. 6 is a flow chart of the biological and carbon treatment system.

The hot detoxified organic vapors leave incinerator 150 through line 156 to enter heat exchanger 158. Steam is supplied to heat exchanger through line 160 to become superheated within the exchanger and exit via line 110. During the heat transfer within exchanger 158, the detoxified organic vapors are cooled as the steam is superheated. The superheated steam within line 110 is supplied to oil separation system 14, and more particularly steam distillation equipment 106 (see FIG. 4). The somewhat cooled vapors leave heat exchanger 158 through line 162 to enter heat recovery boiler 164. Preheated water is introduced into boiler 164 through line 166 to be transformed into steam exiting the boiler through line 90. As this water is transformed to steam, the detoxified vapors are further cooled and exit boiler 164 through line 168, which leads to scrubber 170. Within scrubber 170, the detoxified organic vapors are scrubbed, if necessary, with clean water entering through line 172. The scrubbed vapors are then vented to the atmosphere through vent stack 36, and the contaminated water, if any, is pumped through line 174 to biological and carbon treatment system 18 (see FIG. 6).

An emergency incinerator 150' is also provided to handle the toxic organic vapor in line 152 should incinerator 150 become inoperative. The vapors within line 152 may be directed through line 152' into emergency incinerator 150' where, with air and/or oxygen introduced through line 154', the vapors are incinerated for detoxification. As with incinerator 150, emergency incinerator 150' subjects the vapors to a temperature of approximately 2200° F. for a period of two seconds.

Returning to pyrolyzer 148, the hot detoxified solids and salts exit through line 176 to be conveyed to heat exchanger 178, where the solids and salts are cooled and leave the exchanger through line 38 at a temperature of approximately 1400° F. The material within line 38 is clean, containing neither acidic nor toxic organic compounds, so that this cooled material may be landfilled at any grade disposal site. Water or oil enters heat exchanger 178 through line 180 to become preheated, or warmed, and exit through line 182. If water is conveyed through lines 180 and 182, it is typically fed from line 182 into line 166 to be preheated in boiler 164. If oil is conveyed through lines 180 and 182, the oil is fed from line 182 directly into line 54 leading into mix tank 44 (see FIG. 2). In the preferred embodiment, exchanger 178 is either a jacketed screw or a hollow flight screw which draws the solids and salts through the exchanger.

Biological and carbon treatment system 18 (FIG. 6) includes both biological treatment system 184 and carbon treatment system 186. Contaminated water enters biological treatment system 184, where the toxic organics are biologically degraded, through line 30 from oil separation system 14 (see FIG. 1) and through line 174 from pyrolysis and incineration system 16 (see FIG. 5). Water leaves system 184 through line 188 which leads to carbon treatment system 186. The sludge accumulated within system 184 exits through line 190 to enter biological sludge concentrator 192, which removes water from the sludge and returns the water through line 194 to biological treatment system 184. The dewatered sludge exits concentrator 192 through line 196 and is returned to line 72 to enter mix tank 50 in mixing and neutralization system 10 (see FIG. 2). The contaminated water entering carbon system 186 is carbon treated using absorption techniques and leaves through line 198 as clean, detoxified water. The carbon within system 186 is regenerated periodically by circulating the carbon through lines 200 and 202 to pyrolyzer 204 which subjects the carbon to a temperature sufficiently high to vaporize any absorbed toxic organic compounds, which leave the pyrolyzer through line 206. Pyrolyzer 204 and pyrolyzer 148 (see FIG. 5) may be one and the same, in which case the feed of waste materials through line 34 must be interrupted when the carbon from system 186 is regenerated. Although the preferred system 18 includes both biological system 184 and carbon system 186, the system may include only one or the other of systems 184 and 186, depending upon the types of concentrations of toxics involved.

EXAMPLE

The effectiveness of the method described herein has been confirmed in exemplary experimental tests. In these tests, the oil was that sold by Union Oil as "Solvent 140". The emulsifier was manufactured by ICA Americas Inc. and sold as "TWEEN 61". Bagged hydrated lime was used as the caustic.

The sample waste material was derived from two processes, namely the 3-3' dichlorobenzidine process and the nitration of chlorobenzene. This material was comprised of approximately 33.5% $H_2SO_4$, 0.8% HCl, 2.4% $HNO_3$, 59.8% water, 1.2% salts and 2.3% organics. The salts comprised mainly calcium sulfate, and the organics were mainly 3-3' dichlorobenzidine, ortho-chloroaniline, 2-4' diamino-3-3' dichlorobiphenyl, and 2-5 dinitro-chlorobenzene. The sludge material used was a mixture of the waste material neutralized with the bagged hydrated lime. Consequently, the salts in the sludge material also comprised primarily $CaSO_4$.

The first test was a laboratory run in which 89 grams of waste material were treated. The test began by charging or introducing 200 grams of oil and 1.5 grams of emulsifier into the reaction vessel and mixing for 15 minutes. Thirty-five grams of the hydrated lime were charged into the reaction vessel and the mixture also stirred for 15 minutes. At this point, the 89 grams of waste material were charged into the reaction vessel over a period of approximately 10 seconds. A temperature rise in the reaction vessel from 24° C. to 75° C. was observed. The resultant pH of this wet slurry was approximately 10. To simulate the addition of contaminated sludge slurry, an additional 200 grams of oil were then introduced into the reaction vessel along with an additional 1.5 grams of emulsifier and 103 grams of contaminated sludge. The reactor was then heated to 200° C. to boil off all of the water in the wet slurry. The oil and solids mixture was then cooled to 50° C. and the solids filtered from the oil using filter paper. The filtered salts were then further deoiled with super-heated steam to produce dry, deoiled salts, containing about 0.5% residual oil. The organic compounds at this point comprised approximately 5% of the salt material. The dry, deoiled salts were then pyrolized at 1600° F. for 9 minutes to vaporize the toxic organics, which in the industrial environment would then be incinerated at 2200° F. for 2 seconds. The pyrolized salts were found to be contaminated only to a level of 20 parts per billion or less.

The second test was intended to simulate a plant-size charge in which 890 pounds of the waste material were treated. Similar to the previously described run, 2000 pounds of oil were charged into the reaction vessel, followed by 15 pounds of emulsifier and 350 pounds of caustic. After each of the emulsifier and lime charges, the resulting mixture was stirred for approximately 15 minutes. The 890 pounds of waste material was then charged into the reactor over a period of approximately 30 minutes. A temperature rise of approximately 24° C. to 58° C. was observed. The temperature rise was not as large as in the laboratory test because the relatively large reaction vessel absorbed much of the heat of neutralization. Again, to simulate the introduction of sludge slurry, an additional 2000 pounds of oil and 15 pounds of emulsifier were charged into the reactor followed by 1030 pounds of sludge. The mixture was then heated to 150° C. to boil off the water. The reactor was then cooled to 24° C. and the solids removed from the oil using a centrifuge. The resultant salts were then further deoiled with super-heated steam, yielding dry, deoiled salts containing about 0.5% residual oil and 5% organic compounds. The dry, deoiled salts were then pyrolized at 1600° F. for 9 minutes, yielding salts contaminated only to a level of 20 parts per billion or less. In the commercial method, the gases driven off the pyrolized material will be incinerated at 2200° F. for a period of 2 seconds to presumptively destroy toxic organics contained in the vapor stream.

It should be understood that the above description is intended to be that of a preferred embodiment of the invention. Various changes and alterations might be made without departing from the spirit and broader aspects of the invention as set forth in the appended claims, which are to be interpreted in accordance with the principles of patent law, including the doctrine of equivalents.

The embodiments of the invention in which an exclusive property or privilege is claimed are defined as follows:

1. A method for treating waste material containing both an acid and a toxic organic compound comprising the steps of:
    combining said waste material with sufficient oil and sufficient caustic to form a pumpable slurry having a pH of 7 or higher, said pumpable slurry containing water, a salt, and said toxic organic compound;
    separating said oil from said pumpable slurry to form a deoiled material containing said salt and said toxic organic compound;
    pyrolyzing said deoiled material at a temperature below the melting point of said salt but sufficiently high to vaporize said toxic organic compound; and incinerating the resultant vapor to detoxify said vaporized organic compound.

2. A method as defined in claim 1 wherein said caustic is a concentrated caustic.

3. A method as defined in claim 2 further comprising combining said pumpable slurry with an emulsifier to facilitate emulsification of said water and said salt within said pumpable slurry.

4. A method as defined in claim 1 further comprising combining said pumpable slurry with an emulsifier to facilitate emulsification of said water and said salt within said pumpable slurry.

5. A method as defined in claim 1 further comprising the step of separating said water from said pumpable slurry prior to said oil separation step.

6. A method as defined in claim 5 further comprising at least one of steps of biologically treating and carbon treating said separated water.

7. A method as defined in claim 5 further comprising the step of recovering said heat from said pyrolyzed material.

8. A method as defined in claim 7 further comprising the step of using said recovered heat in said water separation step.

9. A method as defined in claim 5 further comprising the step of recovering heat from the incinerated vapor.

10. A method as defined in claim 9 further comprising the step of using said recovered heat in said water separation step.

11. A method as defined in claim 1 wherein said waste material comprises material from a settling pond.

12. A method as defined in claim 1 wherein said pumpable slurry contains solvents soluble in said oil, and wherein said method further comprises separating said solvents from said oil after said oil separation step.

13. A method as defined in claim 12 further comprising incinerating said separated solvents with said resultant vapor.

14. A method as defined in claim 1 further comprising the step of recovering heat from said pyrolyzed material.

15. A method as defined in claim 14 further comprising the step of using said recovered heat to preheat said oil.

16. A method as defined in claim 1 further comprising the step of recovering heat from the incinerated vapor.

17. A method as defined in claim 16 further comprising the step of using said recovered heat in said oil separation step.

18. A method as defined in claim 1 further comprising the step of scrubbing the incinerated vapor.

19. A method as defined in claim 18 wherein said incinerated vapor is scrubbed with water.

20. A method as defined in claim 19 further comprising at least one of the steps of biologically treating and carbon treating said scrubbing water.

21. A method as defined in claim 1 wherein the separated oil is recycled into said combining step.

22. A method for treating waste material containing both an acid and a toxic organic compound comprising the steps of:
    combining a caustic with an oil to form a caustic slurry;
    combining sufficient caustic slurry with said waste material to form a wet, pumpable slurry having a pH of 7 or higher, said wet, pumpable slurry containing water, a salt, and said toxic organic compound;
    separating said water from said wet, pumpable slurry to form a dry, pumpable slurry;
    separating said oil from said dry, pumpable slurry to form a dry, deoiled material containing said salt and said toxic organic compound;
    pyrolyzing said dry, deoiled material at a temperature below the melting point of said salt but sufficiently high to vaporize said toxic organic compound; and
    incinerating the resultant vapor to detoxify said vaporized organic compound.

23. A method as defined in claim 22 wherein said caustic is a concentrated caustic.

24. A method as defined in claim 23 further comprising combining said pumpable slurry with an emulsifier to facilitate emulsification of said water and said salt within said pumpable slurry.

25. A method as defined in claim 22 further comprising combining said pumpable slurry with an emulsifier to facilitate emulsification of said water and said salt within said pumpable slurry.

26. A method as defined in claim 22 further comprising at least one of the steps of biologically treating and carbon treating said separated water.

27. A method as defined in claim 22 wherein said pumpable slurry contains solvents soluble in said oil, and wherein said method further comprises separating said solvents from said oil after said oil separation step.

28. A method as defined in claim 27 further comprising incinerating said separated solvents with said resultant vapor.

29. A method as defined in claim 22 further comprising the step of recovering said heat from said pyrolyzed material.

30. A method as defined in claim 29 further comprising using said recovered heat in at least one of said water separation step and preheating said oil.

31. A method as defined in claim 22 further comprising the step of recovering heat from the incinerated vapor.

32. A method as defined in claim 31 further comprising the step of using said recovered heat in at least one of said water separation step and said oil separation step.

33. A method as defined in claim 22 further comprising the step of scrubbing the incinerated vapor.

34. A method as defined in claim 33 wherein said incinerated vapor is scrubbed with water.

35. A method as defined in claim 34 further comprising at least one of the steps of biologically treating and carbon treating said scrubbing water.

36. A method as defined in claim 22 wherein the separated oil is recycled into said combining step.

* * * * *